United States Patent

[11] 3,617,325

[72] Inventors  Raymond E. Spokes;
               John William Edwards, Jr.; Daniel Ward Edwards, all of Ann Arbor, Mich.
[21] Appl. No. 833,959
[22] Filed     June 17, 1969
[45] Patented  Nov. 2, 1971
[73] Assignee  Chem-Rite Associates
               Ann Arbor, Mich.
               Continuation-in-part of application Ser. No. 784,091, Dec. 16, 1968, now abandoned.

[54] WRITING
     4 Claims, 3 Drawing Figs.
[52] U.S. Cl. ................................................ 117/1.7,
                               117/36.2, 117/157, 35/66
[51] Int. Cl. .................................................. B44f 1/10
[50] Field of Search .......................................... 117/36.2,
         0.5, 1, 1.5, 1.7; 346/21, 111; 252/408; 35/61, 66;
                                           23/253 TP; 283/6

[56]           References Cited
            UNITED STATES PATENTS
   456,047   7/1891   Meyer ......................... 117/1.7
   997,513   7/1911   Schmidt ....................... 117/1
 2,631,918   3/1953   Kozak .......................... 117/36.2
 2,677,728   5/1954   Kolb ............................ 117/36.7
 2,770,534  11/1956   Marx ........................... 117/36.2
 2,826,511   3/1958   Messinger ..................... 117/1

Primary Examiner—Murray Katz
Attorney—Kinzer, Dorn and Zickert

ABSTRACT: Impermanent marks, they may disappear in a day or less, are created by "writing," with a stylus presenting an alkanolamine, on a sheet of paper coated with a material which changes to a distinctive color upon exposure to the amine. The marks disappear in a short period of time so that exercise books used at the elementary school level can be reused in the following semester or term without additional cost as would be entailed in the purchase of new books.

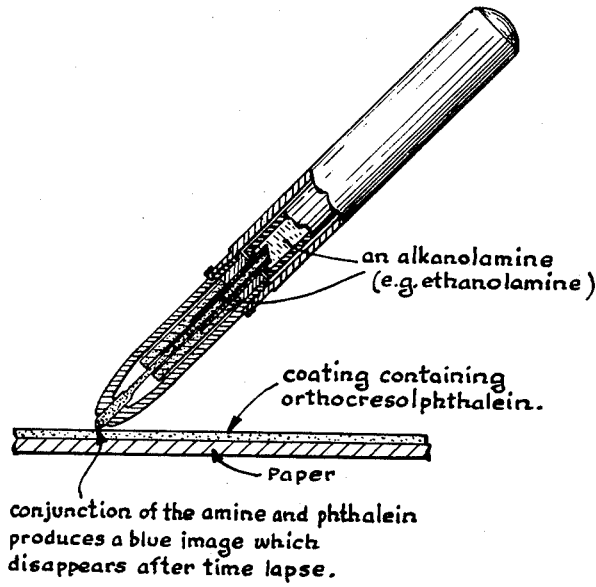

PATENTED NOV 2 1971        3,617,325

Fig.1

| v | v j b v |

Fig.2

Ntpae dern ------------- ------ plagter. -------
------------- ---------- Nvloppo rstrintr. lxplnitri,
kinoa ------------- tinin. ------------------
   Dabato mipton dahado. Stppi ------------ iejnsmo,
Trop ---------------------- ----- ebubb sponw uttabs.

Fig.3

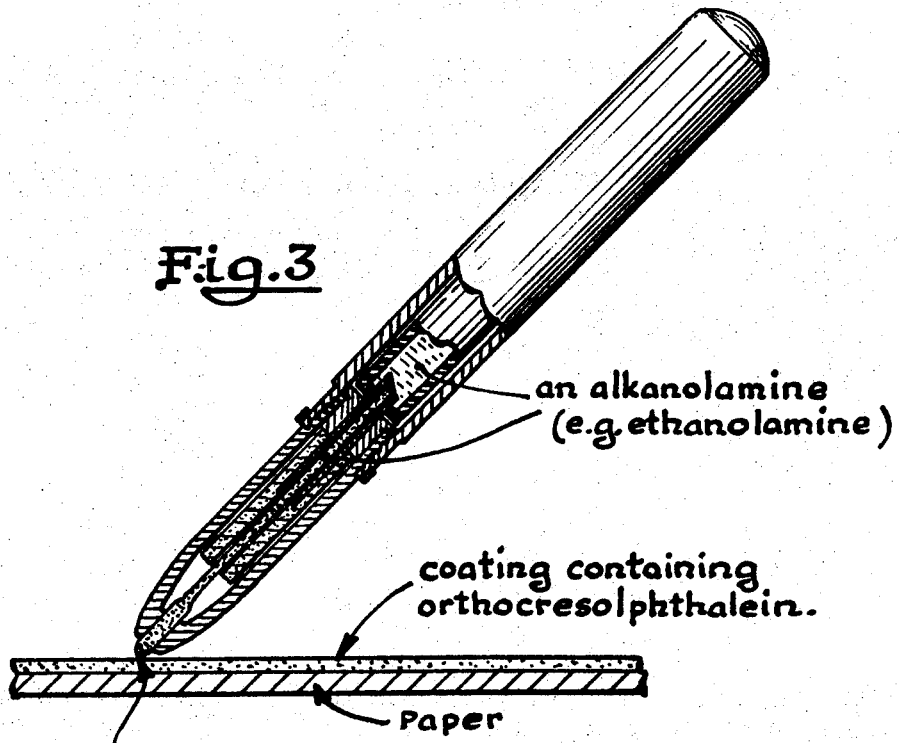

— an alkanolamine (e.g. ethanolamine)

coating containing orthocresolphthalein.

Paper conjunction of the amine and phthalein produces a blue image which disappears after time lapse.

Inventors
Raymond E. Spokes
John William Edwards, Jr.
Daniel Ward Edwards

By Kinzer, Dorn and Zickert
Attorneys

WRITING

This application is a continuation-in-part of application Ser. No. 784,091, filed Dec. 16, 1968.

This invention while primarily concerned with educational systems, and in particular exercises for learning the alphabet and acquiring reading skills, also has other and quite different fields of utility where impermanent marks (disappearing after a lapse of time) are desirable, as in the instance of crossword puzzles, temporary tabulations, brief reckonings, and the like.

Workbooks, such as those used in school exercises, are deemed expendable. Among these specifically is a language system involving a new programming technique requiring an increase in the total number of books and in their size as well. In this system, in one manifest form, relatively thick, softbacked books are presented for sight learning rather than rote memorization. While the system itself takes different forms, attention is directed to FIGS. 1 and 2 which are two examples of what can be viewed as text matter in the books. In FIG. 1, the student is to circle, or otherwise encompass with a mark, the alphabet letters to the right which he recognizes as being identical to the first one in the left surrounded by a printed rectangle itself part of the text. In the system as it is now practiced, such marking by the student is more or less permanent, the delineation being made by a soft pencil, crayon, or the like. While obviously such delineation accomplishes the exercise and enables the teacher to score the work, reuse it not practical unless time is taken to erase the completed exercise, but even so the erasures are not necessarily effective.

Other methods have involved use of a colorless plastic sheet placed over the work, and marks made on the sheet are subsequently removed.

Another example of the visual tracking system is represented by FIG. 2 where the classroom exercise for the student, in the paragraph of jibberish presented, is to inscribe a mark over the first letter "a" he finds, is to mark off the first "b" he finds, and so on, through the paragraph. The student is to give the same treatment to all subsequent paragraphs.

It is to be emphasized that the visual tracking system itself is admittedly satisfactory, but experience has shown that the books really cannot be reused which has curtailed its adoption except in the more affluent school districts where new sets of books can be repeatedly purchased with regard to successive school terms or semesters. Contributions from federal agencies and other public allocations, now being directed to such educational systems, could be diverted to other programs provided the work books could be reused in some efficient manner.

It is therefore a primary object of the present invention to enable the visual tracking system to be reduced in cost by the ability to reuse the texts in a practical sense, and to attain this desirable end by making it possible to develop a temporary but nonetheless visible mark on paper which will become colorless after a lapse of time but within which the teacher can score the exercises.

A related object of the invention is to enable the foregoing objects to be achieved by so coating a sheet of paper as to present on the writing surface a small amount of either orthocresolphthalein, thymolphthalein, phenolphthalein or other material which will change color; then when a stylus, presenting an alkanolamine or some other volatile base is applied to the paper, a reaction takes place producing a visible mark that slowly disappears through time. The mark itself, as thus developed when using orthocresolphthalein, is violet in color, being chemically basic, but being presented as a mark on paper, which is slightly acid, eventually becomes colorless, but no so rapidly as to preclude distinguishing the marks within a reasonable time period, say, from a few hours to several days. The actual time lapse for invisibility, however, may be easily varied.

While utility in this instance is explained primarily in terms of an educational system, the invention of course may be practiced under many different circumstances.

Other and further objects of the present invention will be apparent from the following description and claims and are illustrated in the accompanying drawings which, by way of illustration, shows a preferred embodiment of the present invention and the principles thereof and what is now considered to be the best mode contemplated for applying those principles. Other embodiments of the invention embodying the same or equivalent principles may be used and structural changes may be made as desired by those skilled in the art without departing from the present invention. In the drawings:

FIGS. 1 and 2 are fragments of "text"; and

FIG. 3 shows one mode of practicing the present invention.

There are many chemicals, such as organic dyes, which can by one means or another be made to change color, or become colorless (or vice versa). Usually this is a bright light phenomenon, or one of oxidation as by a bleaching agent. Whatever its form, it must be heated or treated chemically to develop color.

We have found that by coating a paper sheet with a phthalein, and then presenting a volatile alkaline liquid, such as monoethanolamine to the coated sheet, a blue or violet color of extremely good intensity and marking ability results, capable of disappearing as the result of a mere lapse of time and no more. Substantially equal results are obtained when using orthocresolphthalein, thymolphthalein or phenolphthalein. By employing two different alkanolamines, we are able to arrive at a fluid possessing the desired vapor pressure after application to the coated paper bearing the phthalein from which the transitory color is to be developed, such that at once it will effectively penetrate the coating and evaporate rapidly enough to avoid smears, will not bleed through the paper, will not produce a fuzzy image, will disappear at a controlled rate, and may be easily borne by any selected stylus, even a stick. In fact, we can easily vary the rate of disappearance of the mark by adjusting the ratio of the one, monoethanolamine, to the ratio of the other which is diethanolamine or any other suitable alkanolamine such as n-propyl amine.

The coating containing an active component may be applied to any grade of paper intended as one which will accept printing ink, but we prefer to use a good rosin size paper in which the rosin size content is from ½ to 1½ percent by weight, itself having a mineral filler content of 3 to 12 percent. Such sizes, their composition and their application to the paper material, are well known in the art, and are not part of the present invention. Thus, in practicing the present invention, the coating material containing an active component characteristic of the present invention is applied to a sheet of paper, an in commercial production this will be done by means of a doctor blade, or by resorting to a typical roller-coating operation. In a more limited sense, the invention may be practiced by just swabbing the sheet with a coating composition which presents one of the active components.

EXAMPLE 1

Dissolve 3 grams by weight of orthocresolphthalein in 150 cc. isopropyl alcohol, and add 150 cc. of water for dilution, thus making a 1 percent solution of the active component. To this 1 percent solution add 25 cc. of a 4 percent 15,000 c.p.s. Methocel, which is only a thickener, and of which there are many equivalents on the market, including other forms of methylcellulose, ethylcellulose, carboxymethylcellulose, and so on. The thickener is for the purpose of giving body to the coating composition so that it will have some adhesive characteristics and will stick to and adhere to that side of the paper sheet where the visible mark is to be made, without flowing or bleeding excessively from or into the paper base. Thus, one could coat the paper sheet with only the alcohol solution of the active component, but this solution is so thin as to result in a great loss of the active component deep within the interstices of the paper due to excessive penetration.

EXAMPLE 2

The procedure is the same as in example 1, except that a 2 percent solution of the active component is made; but it may be noted that in actual practice we may use as little as ½ percent of the active component or a 5 percent solution. The exact amount may thus vary depending upon the intensity of the color wanted. Furthermore, the amount that is spread on the sheet may vary, and this will affect primarily the extent to which the sheet may be used in repeated operations.

EXAMPLE 3

Instead of orthocresolphthalein, either phenolphthalein or thymolphthalein may be substituted in example 1 or example 2.

The amine presented by the stylus, at the time of contacting the coated side of the sheet, FIG. 3, is responsible for developing the blue-to-violet color characteristic of the chemical transformation of the other active component, which is the phthalein.

The preferred organic base, ethanolamine, may be a (3:1) mixture of 450 cc. of monoethanolamine and 150 cc. of diethanolamine at room temperature, but it may also be a mixture of (5:3) 375 cc. of monoethanolamine and 225 cc. of diethanolamine at room temperature. The ethanolamine may be either one of these amines by itself, and the ratio or percentage of one compared to the other only determines the rate of disappearance of the mark once made on the sheet. Thus, color will disappear more rapidly with an increase in the amount of monoethanolamine which has a vapor pressure at room temperature 100 times higher than diethanolamine—1 vs. 0.01 mm. (Hg).

The second active component, the ethanolamine, is selected primarily for its effectiveness, availability and low cost, so that there may be a choice of some other organic base as an equivalent which will produce the desired color change and then by evaporation allow the phthalein to restore to its original state bereft of the induced color change.

Thus it will be seen that under the present invention we achieve our objectives by incorporating in paper particles of one component (a phthalein) which will change color (and slowly disappear) when exposed to another component presented by a suitable stylus, the other component preferably being an alkanolamine.

We claim:

1. A method of developing information on paper comprising: coating paper uniformly with particles of a first active component selected from the group consisting of phenolphthalein, orthocresolphthalein and thymolphthalein, and subsequently delineating said coating intelligently with a stylus presenting a second active component which is an alkanolamine, thereby to produce a chemical reaction between the two components resulting in a visible mark which without more eventually disappears, 2. A method according to claim 1 in which the amine is a mixture of monoethanolamine and diethanolamine.

3. A method according to claim 1 in which the paper is represented by the pages of a grade school workbook.

4. A method according to claim 2, in which the paper is represented by the pages of a grade school workbook.

* * * * *